United States Patent

Guro et al.

[11] Patent Number: 4,846,851
[45] Date of Patent: Jul. 11, 1989

[54] PURIFICATION OF AMMONIA SYNGAS

[75] Inventors: David E. Guro, Whitehall; Joseph P. Bushinsky, Allentown; David M. Nicholas, New Tripoli, all of Pa.

[73] Assignee: Air Products and Chemicals, Inc., Allentown, Pa.

[21] Appl. No.: 113,787

[22] Filed: Oct. 27, 1987

[51] Int. Cl.[4] ............................................. B01D 53/04
[52] U.S. Cl. ........................................... 55/26; 55/31; 55/62; 55/68; 55/75; 423/359
[58] Field of Search ................... 55/25, 26, 31, 33, 62, 55/68, 75; 423/359

[56] References Cited

U.S. PATENT DOCUMENTS

| | | | |
|---|---|---|---|
| 3,430,418 | 3/1969 | Wagner | 55/62 X |
| 3,564,816 | 2/1971 | Batta | 55/62 X |
| 3,702,525 | 11/1972 | Simon et al. | 55/25 |
| 4,077,779 | 3/1978 | Sircar et al. | 55/25 |
| 4,171,206 | 10/1979 | Sircar | 55/26 |
| 4,171,207 | 10/1979 | Sircar | 55/26 |
| 4,298,588 | 11/1981 | Piato | 423/359 |
| 4,375,363 | 3/1983 | Fuderer | 55/25 |
| 4,376,758 | 3/1983 | Pagani et al. | 423/359 |
| 4,406,674 | 9/1983 | Knoblauch et al. | 55/25 |
| 4,414,191 | 11/1983 | Fuderer | 55/26 X |
| 4,479,925 | 10/1984 | Shires et al. | 423/359 |
| 4,624,841 | 11/1986 | Hidaki | 55/25 X |
| 4,671,893 | 6/1987 | Pinto | 55/26 X |
| 4,695,442 | 9/1987 | Pinto et al. | 55/25 X |

FOREIGN PATENT DOCUMENTS 0157480 2/1985 European Pat. Off.

OTHER PUBLICATIONS

Kirk-Othmer, Encyclopedia of Chem. Tech., 3rd Ed., vol. 2, p. 488, FIG. 13, 1978.
Japanese Patent Early Discl. No. 1984-195, 502, Nov. 6, 1984.

Primary Examiner—Robert Spitzer
Attorney, Agent, or Firm—Geoffrey L. Chase; James C. Simmons; William F. Marsh

[57] ABSTRACT

Crude ammonia synthesis gas is obtained by primary steam reforming of a hydrocarbon gas mixture rich in methane, such as natural gas, followed by secondary reforming of the primary reformate with added air and shift conversion of the contained CO to $CO_2$. The shift conversion product is first freed of contained $CO_2$ by selective absorption in a novel PSA unit having an integrated B section for removal of remaining impurities such as carbon monoxide and methane, thereby providing as product a gas stream comprised of hydrogen and nitrogen in approximate 3:1 molar ratio accompanied by a small amount or argon derived from the air stream used in the secondary reforming step. Alternative embodiments are disclosed for removal of CO from the gas stream, before its entry into the $NH_3$ conversion operation; any residual CO that might have slipped thorugh the absorbent bed of the B section is converted to $CH_4$.

13 Claims, 3 Drawing Sheets

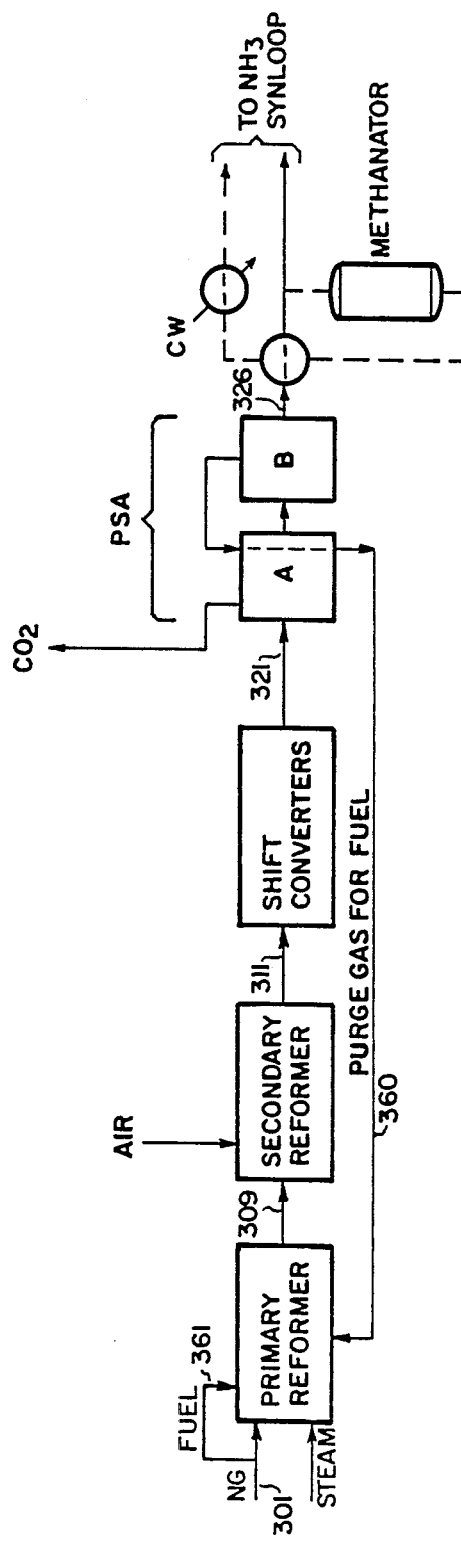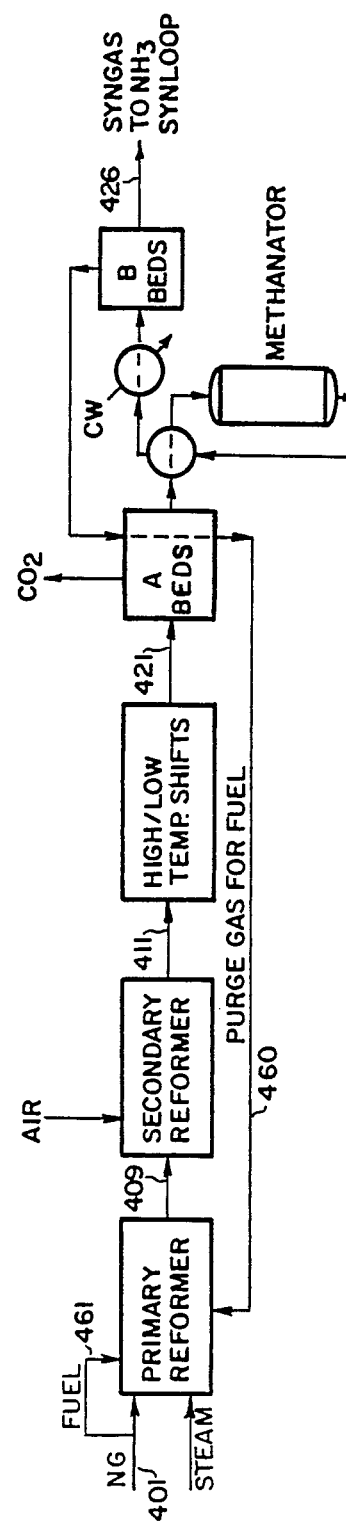

PURIFICATION OF AMMONIA SYNGAS

TECHNICAL FIELD

The present invention is concerned with systems and methods for purification of ammonia synthesis gas and is particularly directed to improvements in such purification employing pressure swing adsorption (PSA).

BACKGROUND OF THE INVENTION

Various methods for production and recovery of hydrogen and/or hydrogen-rich gas streams from gas mixtures obtained in steam reforming of natural gas and other methane-rich gas streams (SMR) are well known in the art. Processes have also been disclosed in which the reformate obtained from hydrocarbon steam reforming is subjected to a secondary oxidative operation in the presence of added air. In instances where the hydrogen product is intended for use in production of ammonia the amount of air employed in the secondary reforming step may provide all or part of the required nitrogen needed to satisfy the $H_2/N_2$ stoichiometric ratio for $NH_3$. Since oxides of carbon (CO and $CO_2$) are present in the reformate as undesired contaminants, the reformate is subjected to a water gas shift reaction to convert contained CO to $CO_2$ and then to procedures for removal of the $CO_2$ and for conversion of any residual carbon oxides to methane (methanation). Such conventional methods for production of ammonia synthesis gas are described in Kirk-Othmer: Encyclopedia of Chemical Technology, third edition (1978), volume 2, page 488, FIG. 13.

The gas composition obtained by primary steam reforming of methane followed by secondary reforming in air, after undergoing a conventional shift reaction is comprised predominantly of hydrogen with lesser amounts of $CO_2$ and nitrogen, constituting > 98% of the total gas mixture. A typical composition may comprise (dry basis) for example:

| | |
|---|---|
| Hydrogen | 61.0 |
| Carbon dioxide | 18.0 |
| Nitrogen | 20.0 |
| Carbon monoxide | 0.5 |
| Methane | 0.3 |
| Argon | 0.2 |

PRIOR ART

In conventional practice for production of ammonia synthesis gas, the removal of contained carbon dioxide from the CO shift reaction effluent is effected by absorption in a liquid such as monoethanolamine (MEA) or alkaline carbonate solution. This practice requires further treatment of the $CO_2$-freed product gas to remove residual contaminants. A common practice is to rid the syngas of contained CO by methanation, as shown for example in U.S. Pat. No. 4,376,758. The resulting gas mixture will then contain in addition to the desired hydrogen and nitrogen, small quantities of relatively inert contaminants such as methane, argon, and in some instances nitrogen in excess of the stoichiometric proportions for $NH_3$; these being present in small amounts in the gas charged to the ammonia synthesis convertor, build up in the ammonia recycle loop of the synthesis, reducing the output of desired ammonia. Various schemes have heretofore been proposed in attempt to avoid or overcome this problem and to enhance the purity of the gas mixture charged for conversion to $NH_3$.

In U.S. Pat. No. 4,375,363 an elaborate pressure swing adsorption procedure is employed for selective removal of adsorbable impurities from a hydrogen-rich gas mixture. The impurity-laden adsorbent bed is purged with nitrogen from an external source and also repressured with a nitrogen gas stream, thereby furnishing the nitrogen requirement for $NH_3$ synthesis gas in the PSA effluent.

Separation of contained impurities from hydrogen-rich gas mixtures by PSA is also disclosed in a number of prior art patents. For example, while U.S. Pat. No. 4,077,779 directed principally to selective removal of $CO_2$ and/or hydrocarbon gases from a hydrogen-containing gas mixture, it also disclosed use of the patented system for separation of methane from its admixture with $CO_2$. A number of earlier prior art patents directed to hydrogen recovery and purification are cited in the introductory portion of the patent specification.

U.S. Pat. No. 4,171,206 discloses a PSA system and operation for separation of multicomponent gas mixture to recover hydrogen as primary key component, carbon dioxide as a secondary component, each at high purity and free of minor tertiary gas components of the mixture. A given example of a starting multicomponent gas mixture treated by the patent method is shift converter effluent from a hydrocarbon reformer plant which contains minor dilute components such as methane, carbon monoxide and nitrogen. A preferred embodiment disclosed in the patent employs a group of six adsorbent vessels designed for operation in parallel in timed sequence, each of these vessels being connected to a second group of three adsorbent vessels through valve-controlled conduits whereby individual vessels of the first group can be placed in series flow communication with a selected vessel of the second group.

U.S. Pat. No. 4,479,925 discloses a method for production of ammonia synthesis gas wherein a starting gas, such as natural gas, is subjected to primary steam reforming followed by secondary reforming with air. Carbon monoxide present in the reformed effluent is converted to dioxide by shift conversion and after conventional carbon dioxide removal and methanation of residual carbon oxides the obtained synthesis gas contains an excess of nitrogen. All or part of the excess of nitrogen may be removed by pressure swing adsorption but preferably is permitted to remain in the gas stream charged to the ammonia converter, subject to being removed in a purge stream withdrawn from the ammonia synthesis recycle loop. The purge stream is processed in a hydrogen recovery unit in which inert gas impurities; such as nitrogen, argon and methane, are removed by semi-permeable membrane or by cryogenic separation.

U.S. Pat. No. 4,298,588 employs the conventional treating sequence for production of ammonia synthesis gas including steam primary reforming, air secondary reforming, carbon monoxide shift followed by removal of carbon oxides, but features the use of excess air in the secondary reforming operation. The primary steam reforming is carried out under conditions that the obtained primary reformate contained preferably in the range of 10 to 20% by volume (dry basis) of methane or typically up to 30%. During the ammonia synthesis reaction a side stream is removed from the ammonia recycle loop and treated to separate out hydrogen, which is returned to the circulating synthesis gas. The non-reactive gases from the hydrogen separation treatment may be discarded or a methane-rich stream separated therefrom and recycled for use as furnace fuel or feed to the primary or secondary reforming operation.

According to the method described in published European patent application No. 0157480 (published Oct. 9, 1985) the raw ammonia synthesis gas is produced from natural gas by two stage reforming, shift reaction and methanation. The obtained raw gas has a nitrogen content in excess of that required for $NH_3$ synthesis and contains $CO_2$ and one or more medium boiling point impurities such as CO, $CH_4$, Ar. The raw gas is passed through an adsorbent bed in which $CO_2$ is strongly adsorbed and medium boiling point gases are partly adsorbed, the unadsorbed effluent constituting the feed to the ammonia converter.

Japan published patent application (Publication No. 1984-195,502; Nov. 6, 1984) discloses a number of different routes for treatment of a product gas obtained from primary or secondary reforming of hydrocarbons and conversion of the contained carbon monoxide. With or without prior removal of $CO_2$ the raw gas (according to an embodiment in which there is a small excess of nitrogen) is separated into a major fraction and a minor fraction, the latter being subjected to pressure swing adsorption for selective removal of nitrogen, thereby adjusting the $H_2/N_2$ ratio of the recombined fractions.

SUMMARY OF THE INVENTION

The present invention provides improvements over prior known methods for purification of ammonia syngas, obtaining significantly lower operating and capital costs. In accordance with the present invention, natural gas or other methane-rich gas stream, is subjected to primary steam reforming in known manner and the primary reformer effluent is mixed with air in an amount sufficient after further treatment to result in substantially a 3:1 $H_2/N_2$ mixture in the subsequent feed to the ammonia converter. The mixture of primary reformate and air after undergoing secondary reforming is subjected to shift conversion thereby forming additional $H_2$ and $CO_2$.

The raw product of the shift conversion is treated by a novel PSA technique comprising the use of two groups of adsorbent beds. The raw gas is passed through a bed of adsorbent in the first group to effect selective removal of $CO_2$ and water therefrom and the remaining effluent from that bed passed in series through an adsorbent bed of the second group wherein the bulk of components, other than the hydrogen and part of the nitrogen, are adsorbed, with resulting discharge of an ammonia syngas effluent consisting essentially of hydrogen and nitrogen in about 3:1 molar proportions. A principal distinguishing feature of the present invention is in the regeneration of the $CO_2$-laden adsorbent beds of the first group by purging these beds to remove sorbed $CO_2$, using the effluent obtained in the desorption and purging of an impurity laden bed of the second group with hydrogen-rich gas.

The operation of the invention and certain of the advantages thereby afforded will be understood from the description which follows read in connection with the accompanying drawings.

BRIEF DESCRIPTION OF THE DRAWINGS

FIG. 2 is a simplified block flow diagram illustrating the feature of regenerating the $CO_2$-laden bed with purge gas from an adsorbent bed of the second group.

FIG. 3 is a simplified block flow diagram of an alternative embodiment for practice of the invention.

DETAILED DESCRIPTION OF PREFERRED EMBODIMENTS

Figure 1:
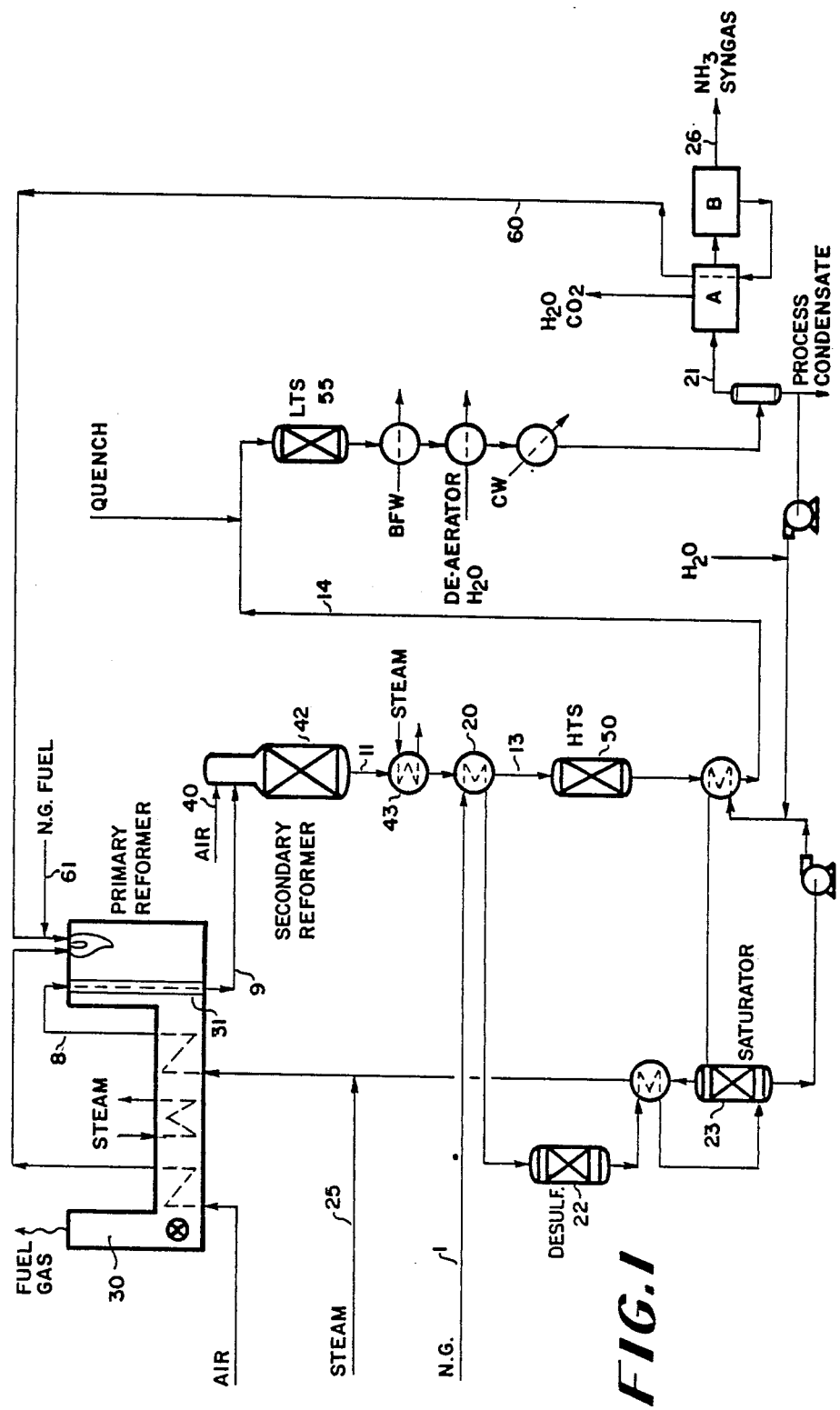
FIG. 1 is a process flow diagram of a system for practice of the invention.

As shown in FIG. 1, the initial feed gas is assumed to be natural gas, labeled NG, although other gas streams rich in methane may be similarly employed. The feed gas provided by line 1 is heated by exchange with hot process gas at 20 and treated in a conventional manner for removal of sulfur compounds at 22. The sulfur-freed effluent is saturated by water introduction at 23. Steam is added through line 25, and the steam-methane mixture is introduced into the primary reformer furnace 30, leaving the convection heating section of the furnace via line 8 and passed through the catalyst-containing tubes 31 in the radiant section of the furnace to discharge through line 9.

The partially reformed product in line 9 is introduced into the secondary reformer 42 where part of the contained methane is combusted by air supplied via line 40. The hot secondary reformate is discharged from secondary reforming via line 11 and cooled as shown at 43 and 20.

The cooled reformate is sent to water-gas shift convertors via lines 13 and 14. Thus, as shown, the reformate undergoes high temperature shift (HTS) conversion at 50 followed by low temperature conversion (LTS) at 55, as is well-known in the art, for conversion of CO to $CO_2$. After further cooling and removal of resulting process condensate, the raw gas product is sent to the PSA unit via line 21.

Figure 4:
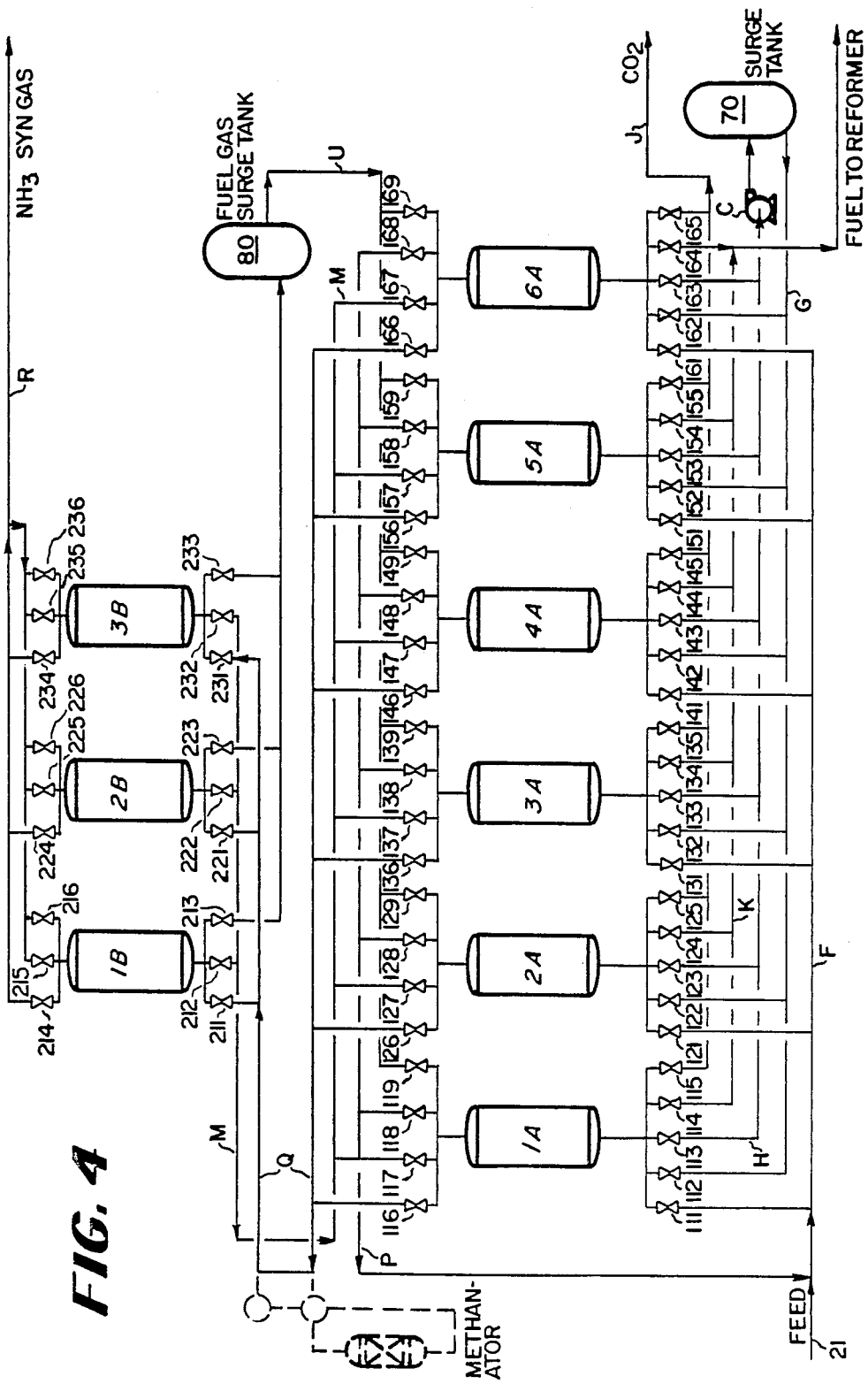
FIG. 4 is a process flow diagram of a preferred multi-column PSA arrangement for purification of the raw ammonia synthesis gas.

The operation thus far described is essentially that largely advocated or employed in prior art practice. In the flow diagram of FIG. 1, the first group of adsorbent columns for removal of $CO_2$ and water from the syngas is designated as the A group and the second group of adsorbent columns is designed as the B group. Conveniently one may employ in practice of the invention six parallel adsorbent columns in the A group and three parallel adsorbent columns in the B group, the arrangement being largely similar to that illustrated in U.S. Pat. No. 4,171,206 cited above. FIG. 4 is the preferred PSA system to be employed in the practice of the invention.

As illustrated in FIG. 1, $CO_2$ and residual water are removed from the synthesis gas product by adsorption in an adsorbent bed of the A group. The effluent thus freed of water and $CO_2$ is passed through an adsorbent bed of the B group wherein CO, $CH_4$ and a small part of the contained nitrogen are adsorbed, while an unadsorbed product stream of ammonia synthesis gas is discharged therefrom in line 26, consisting essentially of hydrogen and nitrogen accompanied by a small amount of argon originating from the air employed in the secondary reforming operation.

On regenerating the B adsorbent beds, as will hereinafter be described, the adsorbed impurities are driven off and discharged as a gas stream which is first used to purge at low pressure an A bed previously saturated with $CO_2$ and water and the purge effluent is then recycled via line 60 for use as fuel in furnace 30.

The initial adsorption step is continued for a preset period of time until or short of breakthrough of the $CO_2$ front from the A column, at which time flow communication between the impurity-laden A and B columns is discontinued and the feed introduction is switched to another A column. At the termination of the adsorption step the A bed will contain adsorbed $CO_2$ and water and the B column will contain principally adsorbed $CH_4$ and CO with a small amount of nitrogen and some hydrogen, and the effluent discharged from the B bed will be comprised of hydrogen, nitrogen and argon, which effluent gas is passed to the $NH_3$ synthesis loop.

An important feature of the present invention is in the use of the gases desorbed from the B bed in the regeneration of the A bed.

Assuming a three minute cycle of operation for the A group of adsorbent columns, the sequence of steps performed in each of the columns during that time period is set out in Table 1, the A columns being designated 1A through 6A and the B columns 1B through 3B (as illustrated in FIG. 4). As seen from the table, during the period that an A column goes through a complete cycle, a B column goes through two complete cycles. For example, during the first thirty seconds column 1A is on the adsorption step in series flow communication with column 1B, after which time flow between these columns is discontinued and the previously involved 1A column and 1B column are each individually subjected to regeneration. At the end of 90 seconds, the 1B column has been cleaned and repressured ready to receive the effluent from another A column then being put on stream; for example, as shown in Table 1, the 1B column receives the unadsorbed primary effluent from column 4A.

During a complete three minute cycle as set out in Table 1, each of the A columns, in turn goes through the following sequence of steps:

1. Adsorption (ADS)—The feed mixture introduced through line 21 (FIG. 1) flows through a pair of initially pressurized adsorption columns (say 1A and 1B) which columns are connected in series flow communication under valve control. The adsorption step is continued for the predetermined time interval preset for breakthrough of $CO_2$ from the discharge end of 1A or somewhat short of breakthrough. Thus, referring to FIG. 4, the feed gas mixture obtained from shift conversion of the reformate (line 21) and having a typical composition as shown in Table 3, is introduced into feed manifold F of the PSA system and flows through then open valve 111 into and through the bed of adsorbent in column 1A wherein $CO_2$ and water are adsorbed. The unsorbed effluent is discharged via open valve 116 and is passed via manifold Q and open valve 211 into column 1B which contains a bed of adsorbent selective for retention of minor components of the feed such as methane and CO. The unsorbed effluent thus freed of these minor components is discharged from column 1B through open valve 214, passing into discharge manifold R. The discharged product is the desired ammonia synthesis gas having a typical composition as appears in Table 3 (line 326).

2. High Pressure Rinse (HPR)—Flow communication between column 1A and 1B is discontinued at the conclusion of the adsorption step by closing valves 116 and 211 therebetween. A stream of essentially pure $CO_2$ is passed through the 1A column via open valve 112 for the preset time interval during which all the void gas and some displaceable sorbed gas is purged out of the column. The effluent discharged at the exit end of the 1A bed is recycled into another A column (2A) then undergoing step 1 of its cycle. Thus, during this step collected $CO_2$ is withdrawn from surge tank 70 via rinse manifold G and passed into and through column 1A, discharging into manifold P through open valve 118 and thereby into feed manifold F. During this time interval column 2A is on the adsorption stroke (step 1) and the recycled gas from manifold P plus the fresh feed from line 21 is introduced into column 2A through from manifold F and then open valve 121.

3. Desorption I (PD)—The rinsed 1A column is depressurized by gas withdrawal therefrom (chiefly $CO_2$) in a direction countercurrent to that of steps 1 and 2, and the column is thus brought to an intermediate pressure level. The desorbed $CO_2$ is recompressed to feed pressure level and employed in rinsing of a companion A column then undergoing step 2. During this step, as shown in FIG. 4, the desorbed gas from column 1A passes through open valve 113 into manifold H and after being compressed at C is stored in surge tank 70. During this time interval column 2A is undergoing step 2 (HPR); high pressure rinse gas from tank 70 flows via manifold G into column 2A through open valve 122.

4. Desorption II (DP)—Column 1A is further depressurized to ambient pressure level by further withdrawal of desorbed $CO_2$ countercurrent to feed direction. The withdrawn $CO_2$ may be collected as secondary product; part of which, if needed, may be employed as purge gas in the PSA cycle. The withdrawn gas flows out of column 1A through open valve 115 into manifold J.

5. Purge (PUR)—At the existing ambient pressure level residual sorbed $CO_2$ remaining in the 1A column is removed by displacement with a purge gas stream released from a B bed as hereinafter described. The low pressure purge gas employed is withdrawn from tank 80 into manifold U and is passed into column 1A through open valve 119. The purge effluent is discharged from column 1A through open valve 114 into manifold K. The product in manifold K has a typical composition as that identified by stream 360 of Table 3 and is recycled for use as fuel in the reformer furnace (line 61, FIG. 1).

6. Pressure Equalization (EQ-BA)—Following the purging step, the 1A column is brought to intermediate pressure level by introduction therein of gas withdrawn from a B column which is at high pressure having completed the adsorption step. During this time interval (150–160 seconds) as indicated in Tables 1 and 2, gas discharged from column 2B through open valve 222 into manifold M, passes into column 1A through then open valve 117; outlet valves from column 1A being closed.

7. Idle (IDL)—During the next ten seconds column 1A is permitted to stand idle.

8. Repressurization (RPR)—Column 1A is brought back to feed pressure level for initiation and repetition of the tabulated cycle. The repressurization is effected with part of the primary product (unadsorbed gas) from manifold R which has passed through column 1B via open valve 215, during pressurization of the B column, as hereinafter described. The repressuring gas has a typical composition corresponding to stream 326 of Table 3 and enters column 1A through reopened valve 117 after being passed from 1B into manifold M via open valve 212.

During the time period (90 seconds), that column 1A is undergoing steps (1) through (3) of the described cycle, column 1B undergoes a complete cycle from adsorption to repressurization, thus:

(a) With columns 1A and 1B being in flow communication, the feed gas freed of $CO_2$ and residual water by adsorption in column 1A passes via open valve 116, manifold Q and open valve 211 into and through the adsorbent bed in column 1B, with the discharge from the exit end of 1B through open valve 214 of a primary product effluent comprised of hydrogen and nitrogen accompanied by a small amount of argon (less than 1% or generally less than ½%). A typical composition of such product is that corresponding to stream 326 of Table 3.

While column 1A is undergoing the high pressure rinse (HPR) of the described cycle, column 1B is subjected to steps (b) and (c) and (d).

(b) Pressure Equalization I (EQ-BA)—Column 1B which has been disconnected from column 1A is now placed in flow communication with another a Column (3A as shown in Table 1) which then had completed step 5, for flow of gas from 1B into the A column via open valves 212 and 137, until the A and B columns are at substantially the same pressure. The gas withdrawn from the B vessel is mainly void gas but may include some gas desorbed from the adsorbent bed in the B column. Gas flow from 1B through open valve 212 is countercurrent to that of step (a), and may be admitted at either end of the connected A column, but here shown as through valve 137.

(c) Pressure Equalization II (EQ-BB)—Following step (b) column 1B is connected to another B column which had been previously rinsed at low pressure with primary effluent (column 3B in the arrangement tabulated in Table 1), thereby further transferring gas from column 1B and bringing the two columns to substantially equal pressure. During this step gas flow in 1B is the same as that in step (b), while the introduction of gas into the companion B column is in the same direction as step (a); valves 212 and 232 being open.

(d) Desorption (DP)—Column 1B is further depressurized through open valve 213 countercurrent to feed direction (step a) to near ambient level. The effluent evolved during this step consists of the dilute impurities of the feed mixture ($CH_4$, CO) and small amounts of primary components ($H_2$, $N_2$) of the feed gas. This effluent is sent to surge tank 80, from which gas may be withdrawn, as needed, for purging the A beds (step 5).

While column 1A is undergoing desorption (PD) column 1B is subjected to purge (PUR), pressure equalization (EQ-BB) and repressuring (RPR) to bring that column to feed pressure level for initiation and repetition of the cycle steps (a) through (g).

(e) PUR—Column 1B is rinsed at near ambient pressure level with part of the manifold R primary gas which is introduced into the column via valve 216 countercurrent to feed direction. The effluent stream discharged through valve 213 may be mixed with effluent from step (d) and the mixture stored in tank 80. Gas withdrawn from tank 80 may be employed for low pressure purge of an A bed previously saturated with $CO_2$ and $H_2$ and the purge effluent recycled for use as fuel to the burners in furnace 30.

(f) (EQ-BB)—Column 1B is brought to intermediate pressure level by introduction therein of gas withdrawn from a companion column (2B) then undergoing step (c). Gas transfer is through open valves 212 and 222.

(g) RPR—Column 1B is brought to initial adsorption pressure level by introduction of primary product gas introduced from manifold R countercurrent to feed direction through open valve 215. During this step column B is connected to one of the A columns (column 4A in the tabulated sequence of Table 1) for flow of repressuring gas from 1B to the A column through open valve 147 until that column (4A) is brought to feed pressure level for initiation and repetition of the 4A bed cycle, as well as that of the 1B cycle.

Table 1 is based on an arbitrary arrangement wherein the A bed cycle is completely carried out in 3 minutes and the B bed cycle in half that time; it will be understood that other cycle time periods can be employed in PSA operations according to the present invention. Table 2 tabulates the valve positions of the associated valves for each A and B column shown in FIG. 4 during a complete cycle.

By the use of purge gas from the B bed to regenerate an A bed, the need for costly evacuation of the A bed is eliminated. Thus, not only are there substantial savings of capital and operating costs of the vacuum pumps and associated parts but also added savings in energy otherwise entailed to provide power requirements for operation of the ammonia conversion synloop.

The flowrates, temperatures and pressures of the various key streams when using the embodiment of the process as set out in FIG. 2, are shown in Table 3.

TABLE 1

| Time (sec) | Cycle Sequence for "B - to - A" Purging | | | | | | | | |
|---|---|---|---|---|---|---|---|---|---|
| | A-Beds | | | | | | B-Beds | | |
| | 1A | 2A | 3A | 4A | 5A | 6A | 1B | 2B | 3B |
| 0–10 | ADS | EQ BA | PUR | DP | PD | HPR | ADS | PUR | EQ BA |
| 10–20 | ADS | IDL | PUR | DP | PD | HPR | ADS | EQ BB | EQ BB |
| 20–30 | ADS | RPR | PUR | DP | PD | HPR | ADS | RPR | DP |
| 30–40 | HPR | ADS | EQ BA | PUR | DP | PD | EQ BA | ADS | PUR |
| 40–50 | HPR | ADS | IDL | PUR | DP | PD | EQ BB | ADS | EQ BB |
| 50–60 | HPR | ADS | RPR | PUR | DP | PD | DP | ADS | RPR |
| 60–70 | PD | HPR | ADS | EQ BA | PUR | DP | PUR | EQ BA | ADS |
| 70–80 | PD | HPR | ADS | IDL | PUR | DP | EQ BB | EQ BB | ADS |
| 80–90 | PD | HPR | ADS | RPR | PUR | DP | RPR | DP | ADS |
| 90–100 | DP | PD | HPR | ADS | EQ BA | PUR | ADS | PUR | EQ BA |
| 100–110 | DP | PD | HPR | ADS | IDL | PUR | ADS | EQ BB | EQ BB |
| 110–120 | DP | PD | HPR | ADS | RPR | PUR | ADS | RPR | DP |
| 120–130 | PUR | DP | PD | HPR | ADS | EQ BA | EQ BA | ADS | PUR |
| 130–140 | PUR | DP | PD | HPR | ADS | IDL | EQ BB | ADS | EQ BB |
| 140–150 | PUR | DP | PD | HPR | ADS | RPR | DP | ADS | RPR |
| 150–160 | EQ BA | PUR | DP | PD | HPR | ADS | PUR | EQ BA | ADS |
| 160–170 | IDL | PUR | DP | PD | HPR | ADS | EQ BB | EQ BB | ADS |

TABLE 1-continued

| Time | Cycle Sequence for "B - to - A" Purging | | | | | | | | |
|---|---|---|---|---|---|---|---|---|---|
| | A-Beds | | | | | | B-Beds | | |
| (sec) | 1A | 2A | 3A | 4A | 5A | 6A | 1B | 2B | 3B |
| 170–180 | RPR | PUR | DP | PD | HPR | ADS | RPR | DP | ADS |

TABLE 2

VALVE POSITION FOR FIG. 4
VALVE POSITION (0 = OPEN; OTHERWISE CLOSED)

VALVE NUMBER

| TIME (SECONDS) | 111 | 112 | 113 | 114 | 115 | 116 | 117 | 118 | 119 | 121 | 122 | 123 | 124 | 125 | 126 | 127 | 128 | 129 | 131 | 132 | 133 | 134 | 135 | 136 | 137 | 138 |
|---|---|---|---|---|---|---|---|---|---|---|---|---|---|---|---|---|---|---|---|---|---|---|---|---|---|---|
| 0-10 | o | | | | | | | | | | | | | | | | | | | | | | | | | |
| 10-20 | o | | | | | | | | | | | | | | | | | | | | | | | | | |
| 20-30 | o | | | | | | | | | | | | | | | | | | | | | | | | | |
| 30-40 | | o | o | | | | | | | | | | | | | | | | | | | | | | | |
| 40-50 | | o | o | | | | | | | | | | | | | | | | | | | | | | | |
| 50-60 | | | | | o | o | | | | | | | | | | | | | | | | | | | | |
| 60-70 | | | | | o | o | | | | | | | | | | o | | | | | | | | | | |
| 70-80 | | | | | | | | o | o | | | | | | | o | | | | | | | | | | |
| 80-90 | | | | | | | | o | o | | | | | | | | o | | | | | | | | | |
| 90-100 | | | | | | | | | | o | o | | | | | | | | | | | o | | | | |
| 100-110 | | | | | | | | | | o | o | | | | | | | | | | | o | | o | o | o |
| 110-120 | | | | | | | | | | | | | o | o | o | | | | | | | | o | o | | |
| 120-130 | | | | | | | | | | | | o | o | o | | | | | | | | | | | | |
| 130-140 | | | | | | | | | | | | | | | | | | o | o | o | | | | | | |
| 140-150 | | | | o | | | | | | | | | | | | | | o | o | o | | | | | | |
| 150-160 | | | | | | | | | | | | | | | | | | | | | | | | | | |
| 160-170 | | | | | | | o | | | | | | | | | | | | | | | | | | | |
| 170-180 | | | | | | | o | | | | | | | | | | | | | | | | | | | |

VALVE NUMBER

| TIME (SECONDS) | 139 | 141 | 142 | 143 | 144 | 145 | 146 | 147 | 148 | 149 | 151 | 152 | 153 | 154 | 155 | 156 | 157 | 158 | 159 | 161 | 162 | 163 | 164 | 165 | 166 | 167 |
|---|---|---|---|---|---|---|---|---|---|---|---|---|---|---|---|---|---|---|---|---|---|---|---|---|---|---|
| 0-10 | o | | | | | | | | | | | | | | | | | | | | | | | | | |
| 10-20 | o | | | | | | | | | | | | | | | | | | | | | | | | | |
| 20-30 | o | | | | | | | | | | | | | | | | | | | | | | | | | |
| 30-40 | | o | o | | | | | | | | | | | | | | | | | | | | | | | |
| 40-50 | | o | o | | | | | | | | | | | | | | | | | | | | | | | |
| 50-60 | | | | | o | o | | | | | | | | | | | | | | | | | | | | |
| 60-70 | | | | | o | o | | o | | | | | | | | | | | | | | | | | | |
| 70-80 | | | | | | | o | o | | | | | | | | o | | | | | | | | | | |
| 80-90 | | | | | | | o | o | | | | | | | | | o | | | | | | | | | |
| 90-100 | | | | | | | | | o | o | | | | | | | | o | o | | | | | | | |
| 100-110 | | | | | | | | | o | o | | | | | | | | o | o | o | o | | | | | |
| 110-120 | | | | | | | | | | | o | o | o | | | | | | | | | o | o | o | | |
| 120-130 | | | | | | | | | | | o | o | o | | | | | | | | | o | o | | o | o |
| 130-140 | | | | | | | | | | | | | | o | o | | | | | | | | | | | |
| 140-150 | | | | | | | | | | | | | | o | o | | | | | | | | | | | |
| 150-160 | | | | o | o | | | | | | | | | | | | | | | | | | | o | o | o |
| 160-170 | | | | o | o | | | | | | | | | | | | | | | | | | | | o | o |
| 170-180 | | | | | | | | | | | | | | | | | | | | | | | | | | o |

VALVE NUMBER

| TIME (SECONDS) | 168 | 169 | 211 | 212 | 213 | 214 | 215 | 216 | 221 | 222 | 223 | 224 | 225 | 226 | 231 | 232 | 233 | 234 | 235 | 236 |
|---|---|---|---|---|---|---|---|---|---|---|---|---|---|---|---|---|---|---|---|---|
| 0-10 | o | o | o | o | o | o | | | | | | | | | | | | | | |
| 10-20 | o | o | o | o | o | o | | | | | | | | | | | | | | |
| 20-30 | | | | | | | o | o | o | o | o | | | | | | | | | |
| 30-40 | | | | | | | o | o | o | o | o | | | | | | | | | |
| 40-50 | | | | | | | | | | | | o | o | o | o | o | o | o | | |
| 50-60 | | | | | | | | | | | | o | o | o | o | o | o | o | o | o |

TABLE 2-continued

VALVE POSITION FOR FIG. 4
VALVE POSITION (0 = OPEN; OTHERWISE CLOSED)

| Range | | | | | | | | | | | | | | | | | | | | |
|---|---|---|---|---|---|---|---|---|---|---|---|---|---|---|---|---|---|---|---|---|
| 60-70 | 0 | 0 | 0 | | | | | | | | | | | | | | | | | |
| 70-80 | 0 | 0 | 0 | | | | | | | | | | | | | | | | | |
| 80-90 | | | | 0 | 0 | | | | | | | | | | | | | | | |
| 90-100 | | | | 0 | 0 | | | | | | | | | | | | | | | |
| 100-110 | | | | | | 0 | 0 | | | | | | | | | | | | | |
| 110-120 | | | | | | | | 0 | 0 | | | | | | | | | | | |
| 120-130 | | | | | | | | | | 0 | 0 | 0 | | | | | | | | |
| 130-140 | | | | | | | | | | | | | 0 | | | | | | | |
| 140-150 | | | | | | | | | | | | | | 0 | | | | | | |
| 150-160 | | | | | | | | | | | | | | | 0 0 | 0 0 | | | | |
| 160-170 | | | | | | | | | | | | | | | | | 0 0 | | | |
| 170-180 | | | | | | | | | | | | | | | | | | 0 0 0 | 0 | 0 |

TABLE 3

Selected Flowrates, Temperatures, and Pressures
For B-to-A Purging, No CO Slip Through B-beds*

| Stream #→<br>Components | 301 | 309 | 311 | 321 | 326 | 360 | 361 |
|---|---|---|---|---|---|---|---|
| | | | | (#mol/hr) | | | |
| Methane | 2644.2 | 1264.0 | 39.8 | 39.8 | — | 39.8 | 508.9 |
| $CO_2$ | — | 799.2 | 931.1 | 2529.1 | — | 1011.6 | — |
| CO | — | 568.9 | 1661.3 | 53.0 | — | 53.0 | — |
| Hydrogen | — | 4903.6 | 6702.9 | 8310.7 | 7404.8 | 856.0 | — |
| Nitrogen | — | — | 3738.7 | 3738.5 | 2990.8 | 747.7 | — |
| Argon | — | — | 44.5 | 44.5 | 44.5 | — | — |
| Water | — | 5729.2 | 6378.3 | 40.8 | — | 16.3 | — |
| Total Flow | 2644.2 | 13264.9 | 19496.6 | 14756.3 | 10440.1 | 2724.4 | 508.9 |
| Press (psia) | 500 | 410 | 400 | 375 | 365 | 24.7 | 500 |
| Temp (°F.) | 60 | 1400 | 1818 | 100 | 100 | 98 | 60 |

*PSA recoveries - 90% $H_2$, 80% $N_2$, no CO slip.
Stream numbers correspond to those shown in FIG. 2.

In the embodiment of the invention illustrated in FIG. 2 a portion (361) of natural gas stream (301), considered as composed of methane or its equivalent, is employed as fuel for the burners used in heating the primary reformer, such as that illustrated at 30 in FIG. 1. Also charged to the primary reformer is a waste gas stream (360) obtained as purge effluent from purging of the A beds of the PSA system (corresponding to stream 60 of FIG. 1). The primary reformate (309) containing unconverted methane is subjected to further reaction with air in the secondary reformer forming a reformate (311) having a typical composition as set out in Table 3, containing CO. After shift conversion there is obtained a product (321) comprised chiefly of $CO_2$, hydrogen and nitrogen accompanied by minor amounts of methane, CO, argon and water. The shift conversion effluent (321) is subjected to treatment in a PSA system having a first group of parallel columns (A) containing adsorbent beds for selective adsorption of water and $CO_2$, in series flow communication with a second group of columns (B) containing adsorbent beds for selective adsorption of methane and CO. As already explained earlier, during the PSA operating cycle, the A bed is purged (PUR) by displacement with a gas stream released from a B-bed and the purge effluent from the A bed is recycled to the primary reformer as a fuel gas stream (designated 60 in FIG. 1) having the typical composition of stream 360 (FIG. 2). The unsorbed gas discharged from the B column as stream 326 typically consists essentially of hydrogen and nitrogen in approximately 2.5:1 molar ratio and contains less than 0.5 percent argon.

The composition of the key streams as set out in Table 3 assumes that substantially all of the CO in the gas stream passed from the A column into the B column will be adsorbed in the B column. There is the possibility, however, considering the high content of $N_2$ in the gas stream entering the B column, that some of the CO may slip through the adsorbent bed in that column. Carbon monoxide is a poison to the catalyst employed in the ammonia converter. As a precaution against such poisoning by CO in instances of its slipping through the B bed adsorbent, the CO in the gas stream may be converted to $CH_4$ by conventional catalytic methanation. Thus, the ammonia syngas feed to the synloop will contain the usual hydrogen, nitrogen and argon, together with the methane impurity. Because of the increased impurity level in the synloop composition, some increase in the synloop power requirement is entailed. The flow pattern employing a methanator is illustrated by the dashed line in FIG. 2.

In accordance with an alternative embodiment that may be employed in practice of the invention, the $CH_4$ that is produced by methanation of CO may be entirely eliminated from the syngas going to the ammonia synloop. This can be accomplished, as illustrated in FIG. 3, by placing the methanator between the $CO_2$ removal beds (A) and the $CO/CH_4$ removal beds (B). Thus, the only impurity in the syngas fed to the synloop will be argon. This arrangement is also illustrated in FIG. 4 with the methanator option added, as shown by the dashed line alternate path for stream Q.

The flowrates, temperatures and pressures of the various key streams when using the FIG. 3 embodiment, are set out in Table 4.

In FIG. 3 the various streams identified by reference numerals from 401 through 461 correspond to the streams numbered 301 through 361 in the FIG. 2 embodiment. Except for the location of the methanator, the operation of the FIG. 3 embodiment is substantially the same as that described in connection with the FIG. 2 embodiment. Slight differences in the designated percentage composition of components of the corresponding streams result principally from the higher methane content of the recycle (stream 460) in the FIG. 3 embodiment as compared to that (stream 360) of the FIG. 2 embodiment.

TABLE 4

Selected Flowrates, Temperatures, and Pressures
For B-to-A Purging, With Methanator Between A & B Beds

| Stream #→<br>Components | 401 | 409 | 411 | 421 | 426 | 460 | 461 |
|---|---|---|---|---|---|---|---|
| | | | | (#mol/hr) | | | |
| Methane | 2687.1 | 1284.6 | 41.4 | 41.4 | — | 95.7 | 489.1 |
| $CO_2$ | — | 812.2 | 941.2 | 2568.8 | — | 1027.5 | — |
| CO | — | 578.2 | 1692.3 | 54.3 | — | — | — |
| Hydrogen | — | 4983.4 | 6836.5 | 8474.0 | 7403.7 | 856.5 | — |
| Nitrogen | — | — | 3738.7 | 3738.5 | 2990.8 | 747.7 | — |
| Argon | — | — | 44.5 | 44.5 | 44.5 | — | — |
| Water | — | 5822.2 | 6455.4 | 41.3 | — | 49.9 | — |
| Total Flow | 2687.1 | 13480.6 | 19750.1 | 14962.8 | 10439.0 | 2777.4 | 489.1 |
| Press (psia) | 500 | 410 | 400 | 375 | 365 | 24.7 | 500 |

TABLE 4-continued

Selected Flowrates, Temperatures, and Pressures
For B-to-A Purging, With Methanator Between A & B Beds

| Stream #→ | 401 | 409 | 411 | 421 | 426 | 460 | 461 |
|---|---|---|---|---|---|---|---|
| Components | | | | (#mol/hr) | | | |
| Temp (°F.) | 60 | 1400 | 1818 | 100 | 100 | 73 | 60 |

*PSA recoveries - 90% $H_2$, 80% $N_2$. 20% CO would slip.
Stream numbers correspond to those shown in FIG. 3.

As seen from Tables 3 and 4, about 90% of the hydrogen and 80% of the nitrogen present in the gas stream admitted to the PSA system via line 321 or 421 respectively is recovered in the syngas leaving the system via line 326 or 426 respectively and made available for $NH_3$ synthesis. A large part of the remaining hydrogen which is not utilized in the $NH_3$ synthesis is beneficially employed (via line 360 or 460 respectively) in supplying part of the fuel required for use in the primary reformer.

Any adsorbent which is selective in the retention of $CO_2$ from a feed gas mixture can be used in the A beds in practice of the present invention, the referred adsorbent being activated carbon. In the B beds the adsorbent should be one or a combination of adsorbents selective for adsorption of CO and $CH_4$ from a multi-component gas mixture containing these as minor components, in association with hydrogen and nitrogen which largely pass through the bed unadsorbed. A preferred combination of adsorbents for the B beds is activated carbon and 5A molecular sieve in admixture or in separate layers of the B beds.

As hereinbefore described in step 5 (PUR) of the cycle the sorbed $C_2$ and $H_2O$ are removed and discharged from the A bed by introduction of a mixture of gases withdrawn from a B bed during the desorption (DP) and high pressure purge (PUR) steps. This purge gas, which originated from a B bed and contains CO, $CH_4$, and $N_2$, in passing through the water as well as $CO_2$ from the A bed. Since the amount of the purge gas is approximately twice the theoretical amount needed to effect the desorption of the $CO_2$ and water, it is effective in regenerating the A bed to an acceptable level.

What is claimed:

1. In the separation of a multicomponent feed gas mixture for recovery therefrom of contained major components consisting of hydrogen and nitrogen freed of carbon dioxide and further substantially freed of minor components from the group consisting of methane and carbon monoxide, the method which comprises in an adiabatic adsorption pressure swing cycle the steps of:
   (a) passing such multicomponent gas mixture at initial super-atmospheric pressure in selected flow direction through a first sorbent bed (A) selective for preferential retention of carbon dioxide and then passing the effluent from said first bed through a second sorbent bed (B) selective for retention of said minor components while discharging from said second sorbent bed unadsorbed hydrogen and nitrogen, said passing of said multicomponent gas mixture being continued for a controlled time period short of breakthrough of carbon dioxide from said first sorbent bed, while retaining in said second bed substantially all of sorbed methane and any carbon monoxide present in said mixture;
   (b) thereafter discontinuing gas flow communication between said first and second sorbent beds, and
      (i) rinsing said first bed by flowing a stream of relatively pure carbon dioxide therethrough at substantially the initial super-atmospheric pressure of step (a) for a controlled time period effective to remove most of the void and displaced gases from said first bed, and during this time period (b),
      (ii) lowering the pressure in said second bed to an intermediate level by withdrawal therefrom of a gas stream containing void and desorbed gases, and thereafter
      (iii) further depressuring said second bed to near ambient pressure followed by purging the second bed at near ambient pressure with a stream of the recovered major components:
   (c) after said rinsing step in (b) above reducing the pressure in said first bed to an intermediate level by desorption of gas therefrom including previously sorbed carbon dioxide and during this step (c) repressuring said second bed to an intermediate pressure level by flow thereinto of gas substantially free of carbon dioxide;
   (d) following step (c) above further desorbing gas from said first bed to lower the pressure therein to substantially ambient level, and thereafter
   (e) purging said first bed with a stream consisting essentially of said minor components, $CH_4$ and CO and small amounts of the major components, $H_2$ and $N_2$ purged from said second bed during step (iii) above;
   (f) introducing into the purged first bed a gas stream substantially free of carbon dioxide to bring said first bed to an intermediate pressure level, and thereafter
   (g) further repressuring said first bed to initial super-atmospheric pressure level by flowing thereinto a stream of hydrogen and nitrogen via a second bed which had already been brought to intermediate pressure level, thereby bringing both said beds to the super-atmospheric pressure of step (a) and making them ready to repeat the defined sequence of steps beginning with the reintroduction of the multicomponent feed gas mixture into said first sorbent bed.

2. The method as defined in claim 1 wherein said multicomponent feed gas mixture is one obtained by primary steam reforming of a hydrocarbon stream rich in methane followed by secondary reforming in added air; and
   wherein most of the carbon monoxide present after said secondary reforming has been converted to carbon dioxide by a watergas shift reaction.

3. The method as defined in claim 2 wherein said multicomponent feed gas mixture subjected to separation by adiabatic pressure swing adsorption comprises by volume about 75% to 85% hydrogen and nitrogen and about 15% to 20% carbon dioxide and contains argon in an amount less than about one-half percent.

4. The method as defined in claim 3 wherein the hydrogen and nitrogen of said feed gas mixture are present in an $H_2/N_2$ molar ratio of 2/1 to 2.5/1.

5. The method as defined in claim 2 wherein the unadsorbed hydrogen and nitrogen composition discharged from said second sorbent bed are present in the molar ratio of about 2.5:1.

6. The method as defined in claim 5 wherein said discharged composition is subjected to catalytic interreaction for synthesis of $NH_3$.

7. The method as defined in claim 1 wherein carbon monoxide present in the unadsorbed discharge from said second bed during step (a) is converted to methane by a methanation reaction.

8. The method as defined in claim 1 wherein the effluent from said first bed (A) of step (a) is passed through a methanator where essentially all of the carbon monoxide is converted to methane via the methanation reaction.

9. The method as defined in claim 8 wherein said multicomponent feed gas mixture is one obtained by primary steam reforming of a hydrocarbon stream rich in methane followed by secondary reforming in added air; and wherein most of the carbon monoxide present after said secondary reforming has been converted to carbon dioxide by a watergas shift reaction.

10. The method as defined in claim 9 wherein said multicomponent feed gas mixture subjected to separation by adiabatic pressure swing adsorption comprises by volume about 75% to 85% hydrogen and nitrogen and about 15% to 20% carbon dioxide and contains argon in an amount less than about one-half percent.

11. The method as defined in claim 10 wherein the hydrogen and nitrogen of said feed gas mixture are present in an $H_2/N_2$ molar ratio of 2/1 to 2.5/1.

12. The method as defined in claim 9 wherein the unadsorbed hydrogen and nitrogen composition discharged from said second sorbent bed are present in the molar ratio of about 2.5:1.

13. The method as defined in claim 12 wherein said discharged composition is subjected to catalytic interreaction for synthesis of $NH_3$.

* * * * *